United States Patent
Murakami et al.

(10) Patent No.: US 10,905,954 B2
(45) Date of Patent: Feb. 2, 2021

(54) INFORMATION PROCESSING DEVICE AND GAME PROCESSING METHOD

(71) Applicant: SEGA CORPORATION, Tokyo (JP)

(72) Inventors: Takashi Murakami, Tokyo (JP); Kengo Uda, Tokyo (JP); Kenichi Yamamoto, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 7 days.

(21) Appl. No.: 15/938,751

(22) Filed: Mar. 28, 2018

(65) Prior Publication Data

US 2018/0280797 A1 Oct. 4, 2018

(30) Foreign Application Priority Data

Mar. 28, 2017 (JP) ................ 2017-062856

(51) Int. Cl.
*A63F 13/358* (2014.01)
*A63F 13/335* (2014.01)
*A63F 13/34* (2014.01)

(52) U.S. Cl.
CPC .......... *A63F 13/358* (2014.09); *A63F 13/335* (2014.09); *A63F 13/34* (2014.09)

(58) Field of Classification Search
CPC ..... A63F 13/12; A63F 13/358; H04L 41/0816
See application file for complete search history.

(56) References Cited

U.S. PATENT DOCUMENTS

2013/0262203 A1* 10/2013 Frederick ........... G06Q 30/0209
705/14.12

FOREIGN PATENT DOCUMENTS

| JP | 2000-254354 A | 9/2000 |
|---|---|---|
| JP | 2006-254946 A | 9/2006 |
| JP | 2014-033371 A | 2/2014 |
| JP | 2016-150207 A | 8/2016 |

OTHER PUBLICATIONS

Office Action in counterpart Japanese Patent Application No. 2017-062856 dated Apr. 25, 2017 (6 pages).

* cited by examiner

*Primary Examiner* — David L Lewis
*Assistant Examiner* — Robert E Mosser
(74) *Attorney, Agent, or Firm* — Osha Bergman Watanabe & Burton LLP

(57) ABSTRACT

An information processing device is disclosed including a processor that controls progress of a game in which a plurality of players can participate simultaneously based on operation inputs at a plurality of game terminals. The plurality of game terminals includes a leader terminal and a member terminal. The information processing device further includes memory connected to the processor and that manages one of the plurality of game terminals as a host terminal. The processor causes the memory to set the leader terminal as the host terminal. The processor inspects communication quality of the host terminal during execution of the game. When the leader terminal is the host terminal and the communication quality satisfies a predetermined condition, the processor causes the memory to set the member terminal as the host terminal, without changing the leader player.

4 Claims, 5 Drawing Sheets

FIG. 4

| GID | TID | Leader | Host | Ping value (msec) |
|---|---|---|---|---|
| G01 | T01 | O | O | 10 |
| G01 | T07 | - | - | 151 |
| G01 | T14 | - | - | 21 |
| G02 | T02 | - | - | 111 |
| G02 | T15 | O | - | 121 |
| G02 | T18 | - | O | 17 |
| G02 | T04 | - | - | 37 |
| G04 | T11 | - | - | 17 |
| ⋮ | ⋮ | ⋮ | ⋮ | ⋮ |

INFORMATION PROCESSING DEVICE AND GAME PROCESSING METHOD

TECHNICAL FIELD

The present invention generally relates to controlling communication in a computer game.

RELATED ART

The use of a smartphone as a game terminal, and not just as a communication terminal, has become quite widespread. Network games that are enjoyed on smartphones are provided by using a smartphone to access a platform built into a game server. Network games are usually designed to emphasize character development, cooperation and competition with other players, and the collection of cards and items.

Some network games have game groups made up of a plurality of players. In general, a game group is organized when a player who will be the leader decides to recruit members. Herein, a player who recruits members in his capacity as a leader shall be referred to as a "leader player," and a player who is recruited by the leader player and participates in a game group shall be referred to as a "member player."

In the peer-to-peer type network game disclosed in Patent Literature 1, one of a plurality of game devices serves as the host terminal (server). The other game devices are clients. It is generally believed that the progress of the network game disclosed in Patent Literature 1 largely depends on the processing capability and communication quality of the host terminal.

Even in a server/client type of network game, the game terminal of the leader player becomes the host terminal, and the game server usually adjusts the execution speed of the network game to match the communication speed of the host terminal. This is based on the design philosophy of giving preferential treatment to the leader player by setting an execution speed that is suited to the leader player presiding over the team. In this case, the leader player (host terminal) can enjoy multiplay without being affected by the communication quality of the member players (non-host terminals).

Patent Literature 1: JP-A 2006-254946

The above design philosophy means that regardless of whether it is a peer-to-peer type or a server-client type, the communication quality of the host terminal greatly affects the execution speed of the game. In Patent Literature 1, if the leader player (host terminal) should end up being disconnected, communication is maintained by re-selecting the host terminal and reconnecting (see, for example, paragraph 0066 of Patent Literature 1). However, when reconnection happens during a game, this in fact interrupts the game. In particular, with games in which real-time action is important, processing for reconnection during the game is not something that players would consider acceptable.

SUMMARY

One or more embodiments of the present invention provide a technique for maintaining comfortable communication over an entire communication network in a multi-player network game.

The information-processing device according to a mode of the present invention comprises a game controller that controls the progress of a game in which a plurality of players can participate at the same time on the basis of operation inputs at a plurality of game terminals, a host setting component that sets one of a plurality of game terminals to be the host terminal, and a speed adjustment component that sets the game execution speed on the basis of the communication quality of the host terminal.

The host setting component selects the host terminal on the basis of the communication quality of each of the plurality of game terminals.

One or more embodiments of the present invention provide an information processing device that includes a processor that controls progress of a game in which a plurality of players can participate simultaneously based on operation inputs at a plurality of game terminals. The plurality of game terminals includes a leader terminal and a member terminal. The information processing device further includes memory connected to the processor and that manages one of the plurality of game terminals as a host terminal. The processor causes the memory to set the leader terminal as the host terminal. The processor inspects communication quality of the host terminal during execution of the game. When the leader terminal is the host terminal and the communication quality satisfies a predetermined condition, the processor causes the memory to set the member terminal as the host terminal, without changing the leader player.

One or more embodiments of the present invention provide a game information processing method that causes a computer to execute a game program. The method includes controlling, with a processor, progress of a game in which a plurality of players can participate simultaneously, based on operation inputs at a plurality of game terminals. The plurality of game terminals included a leader terminal and a member terminal. The method further includes managing, with a memory, one of the plurality of game terminals as a host terminal, causing, with the processor, the memory to set the leader terminal as the host terminal, inspecting, with the processor, communication quality of the host terminal during execution of the game, and causing, with the processor, the memory to set the member terminal as the host terminal when the leader terminal is the host terminal and the communication quality satisfies a predetermined condition, without changing the leader player.

According to one or more embodiments of the present invention, it is easy to maintain comfortable communication overall in a multiplayer network game.

BRIEF DESCRIPTION OF DRAWINGS

FIG. 4 is a data structure diagram of communication setting information according to one or more embodiments of the present invention.

DETAILED DESCRIPTION

Embodiments of the present invention will be described in detail below with reference to the drawings. In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In a network game according to one or more embodiments (hereinafter referred to as "game G"), game groups (teams) are organized by a plurality of players. A leader player establishes a game group and recruits member players. The players band together to battle enemy characters. As will be described in detail below, the execution speed of the game G is adjusted according to the communication quality of the host terminal.

In the following, the description will focus on the method for inspecting the communication quality and setting the host terminal.

Figure 1:
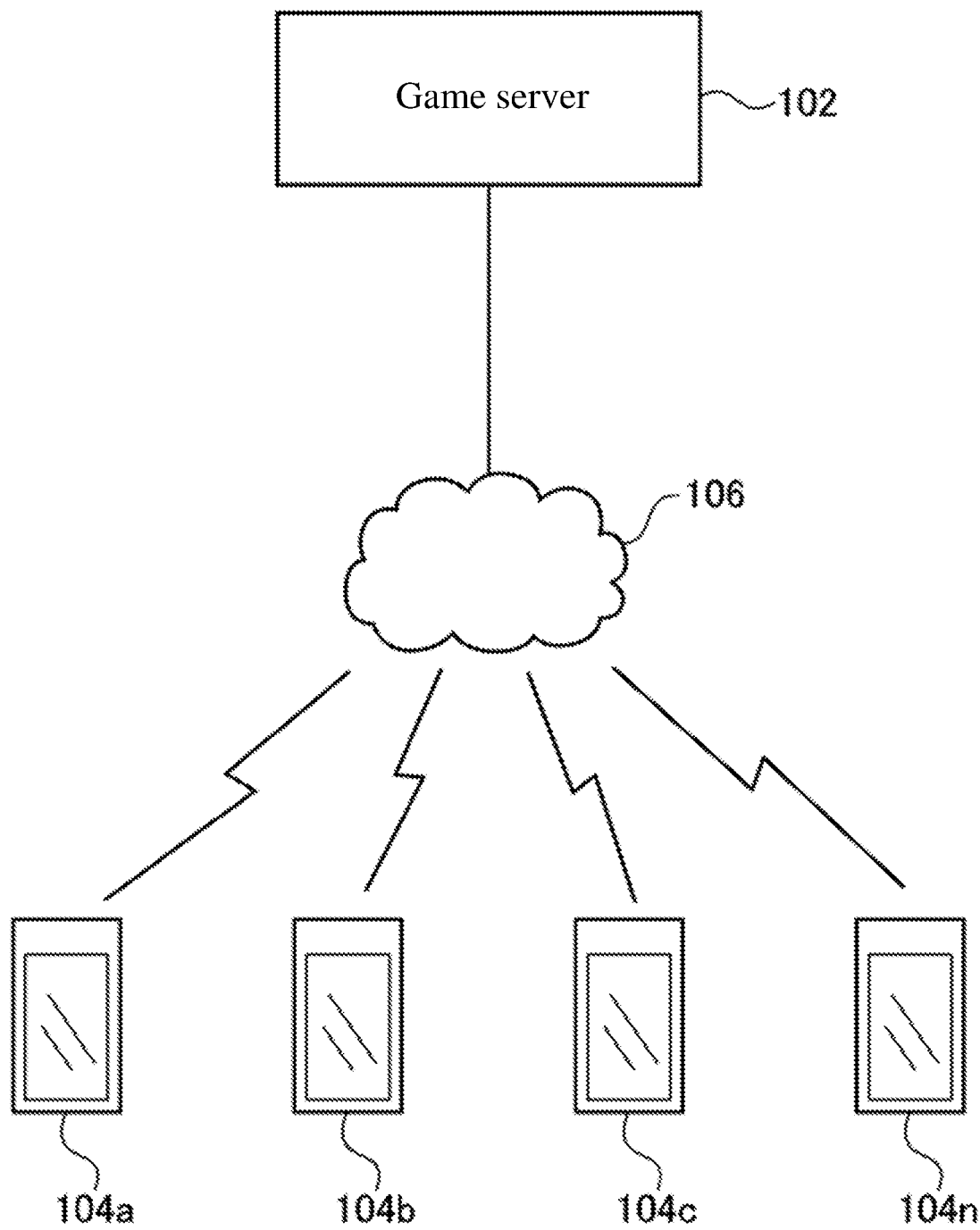
FIG. 1 is a hardware configuration diagram of a game system according to one or more embodiments of the present invention.

FIG. 1 is a hardware configuration diagram of the game system 100.

In the game system 100, a plurality of game terminals 104a, 104b, 104c, . . . , 104n (hereinafter, when referred to as a group, or when discussed without being distinguished from one another, these will be collectively called the "game terminals 104") are connected to the game server 102 via the Internet 106. The game terminals 104 in one or more embodiments are assumed to be smartphones. The game terminals 104 may be portable dedicated game machines, or may be general-purpose computers such as laptop PCs. The game terminals 104 and the Internet 106 are connected wirelessly, but may also be connected by wire. A unique ID called a player ID is assigned ahead of time to each player of the game. The game server 102 provides the game to each of the game terminals 104.

Figure 2:
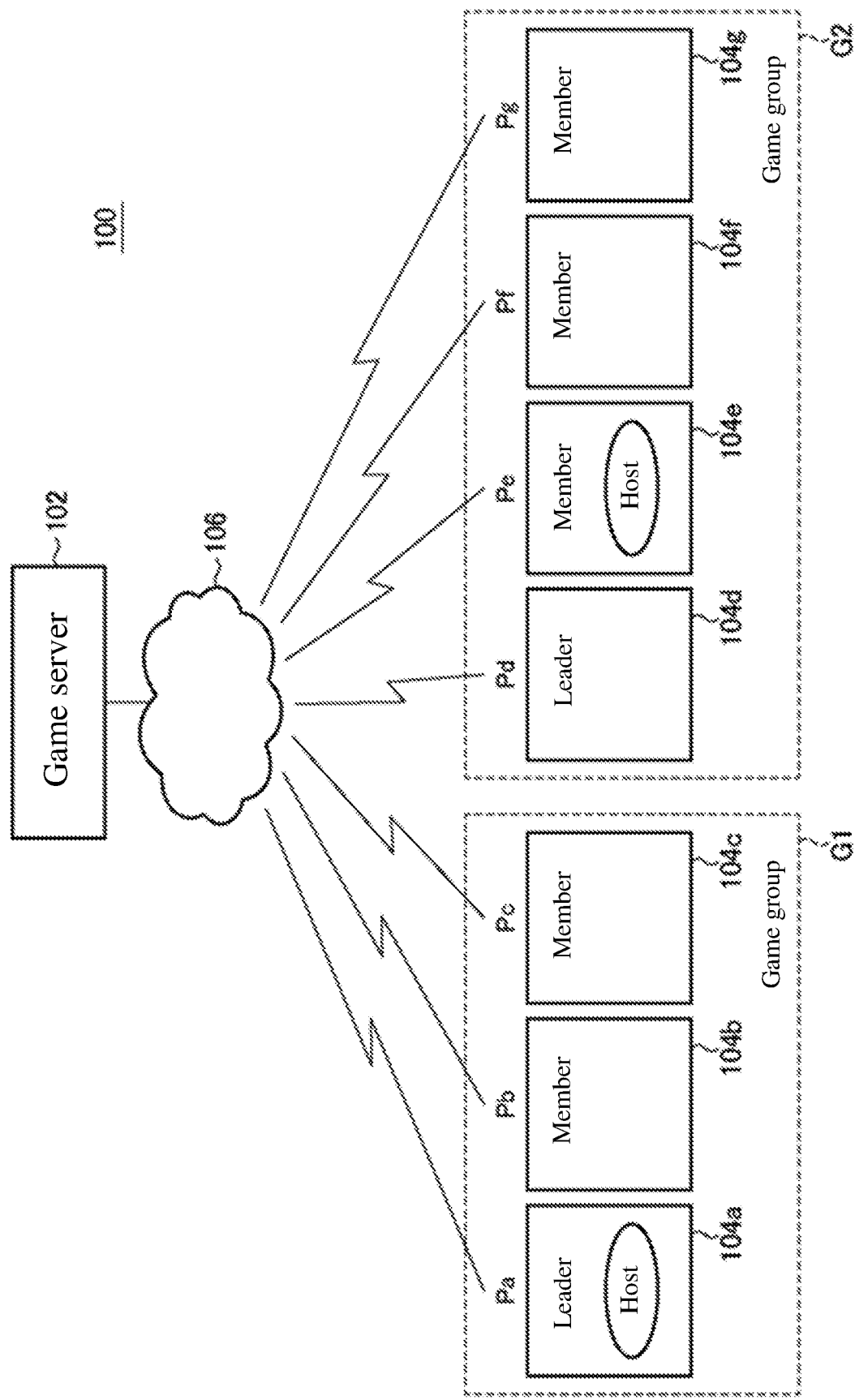
FIG. 2 is a simplified diagram of the relation between a game group and a host terminal according to one or more embodiments of the present invention.

FIG. 2 is a simplified diagram of the relation between a game group and the host terminal. In FIG. 2, two game groups G1 and G2 are formed. The player Pa of the game terminal 104a is the leader player. The game group G1 is formed by the leader player Pa and the member players Pb and Pc, who have been recruited by the leader player Pa. Similarly, member players Pe, Pf, and Pg participate in the game group G2, whose leader player is the player Pd of the game terminal 104d. In both of the game groups, there is only one leader player, who is the one who proposed the game, and the others are member players.

Hereinafter, the game terminal 104 of the leader player shall be referred to as the "leader terminal," and the game terminals 104 of the member players shall be referred to as "member terminals." In one or more embodiments, the leader terminal is initially set as the host terminal by the group organizer of the game server 102 at the point when the game group is organized.

Players belonging to the same game group help each other fight against enemies that appear in the game G. In the game G, a player manipulates his own player character (not shown), and uses a sword and magic to fight the enemy. Because the enemies attack in real time, players are required to react quickly.

When a player manipulates his player character, the details of that operation are transmitted from the game terminal 104 to the game server 102. The game server 102 receives the operation details, determines the action of the enemy, and transmits the resulting action of the enemy to the game terminals 104. At the game terminals 104, graphics change in accordance with the enemy's behavior.

In the game group G1, the leader terminal 104a also serves as the host terminal. The host terminal is the determining factor for the execution speed of the game G in the game group. Therefore, the responsiveness of the game server 102 to operation inputs at the member terminals 104b is affected not only by the processing speed and communication quality of the member terminals 104b (non-host terminals) themselves, but also by the processing speed and communication quality of the leader terminal 104a (host terminal).

The communication quality will now be assumed to be synonymous with the communication speed. Also, in one or more embodiments, it is assumed that the execution speed of the game G is the number of operations that the game server 102 can accept (process) per unit of time.

The higher the communication speed of the game terminals 104, the more frequently operation information can be transmitted to the game server 102. The execution speed of the game G is greatly affected by the processing speeds of the game server 102 and the game terminals 104, as well as by the communication speed of the game terminals 104. The higher the communication speed and processing speed, the more times a player can input an operation per unit of time, which means the game will be more enjoyable. However, since there is a physical limit to a player's own operating speed, players can enjoy sufficiently fast play so long as the processing speed and the communication speed are at least at a certain level. In one or more embodiments, it is assumed that both the game server 102 and the game terminal 104 have sufficient processing speed.

If the communication speed of the host terminal is high and the communication speed of the non-host terminals is also high, there is no particular problem even if the execution speed of the game G is limited to the communication speed of the host terminal (case 1). If the communication speed of the host terminal is high but the communication speed of the non-host terminals is low, then the players of the non-host terminals will be at a disadvantage compared to the player of the host terminal (case 2). For example, during a period when the player of the host terminal makes three operations, it may be that only one operation can be made at a non-host terminal. However, such a disadvantage is attributable to the communication quality of the non-host terminal itself. If the communication speeds of the host terminal and the non-host terminals are both low, the execution speed of the game G will be slow overall (case 3). The disadvantage in this case is also attributable to the communication quality of the game terminals 104.

If the communication speed of the host terminal is low and the communication speed of the non-host terminals is high, even though the non-host terminals have sufficient communication speed, the non-host terminals will be restricted by the communication speed of the host terminal (case 4). For example, even though the non-host terminals can perform five operations per second, if the host terminal can only be operated once per second, the game server 102 will accept only one operation per second. The players of the non-host terminals cannot enjoy operability above that of the player of the host terminal. The performance of the game group is restricted by the communication speed of the host terminal (leader terminal). The reason for deliberately imposing this restriction is to make it easier for the leader player to take leadership by giving preferential treatment to the leader player who presides over the game group over member players.

The game system 100 according to one or more embodiments includes a method for maintaining comfortable communication for the game group as a whole in case 4. The details will be described below, but the leader terminal is set as the host terminal at the point when the game group is organized. However, if the communication speed of the leader terminal (host terminal) is particularly slow, the "host" is changed from the leader terminal to a member terminal. That is, using the leader terminal as the host terminal gives preferential treatment to the leader player, but if the leader terminal is not suitable as the host terminal, the leader player is stripped of the privilege of being "host," thus preventing the overall performance of the game group from dropping off excessively.

In the game group G2, since the leader terminal 104d is disqualified from being the host, the member terminal 104e becomes the host terminal.

In one or more embodiments, the game server 102 periodically transmits a ping to the game terminals 104. This ping is a lightweight communication command based on ICMP (Internet Control Message Protocol), which is used to measure how long it takes for a destination to be able to communicate, that is, how long communication takes. Many network games can be played comfortably as long as the communication speed measured by ping (hereinafter referred to simply as the "ping value") is less than 50 msec (milliseconds), and it is generally said that you can comfortably play any network game if the ping value is less than 10 msec.

In one or more embodiments, when the ping value of the host terminal is at or below a threshold T, that is, when the communication speed of the host terminal is sufficiently fast, the "host" is not changed, but when the ping value is over the threshold T, that is, when the communication speed of the host terminal is insufficient, a "disqualification condition" is met and the "host" is changed. The disqualification condition is an example of a predetermined condition. With this control method, if the communication speed of the host terminal is insufficient as in case 4, the overall performance of the game group is prevented from decreasing. The threshold T can be set as desired, but in one or more embodiments, it is assumed that the threshold T is 50 msec.

Figure 3:
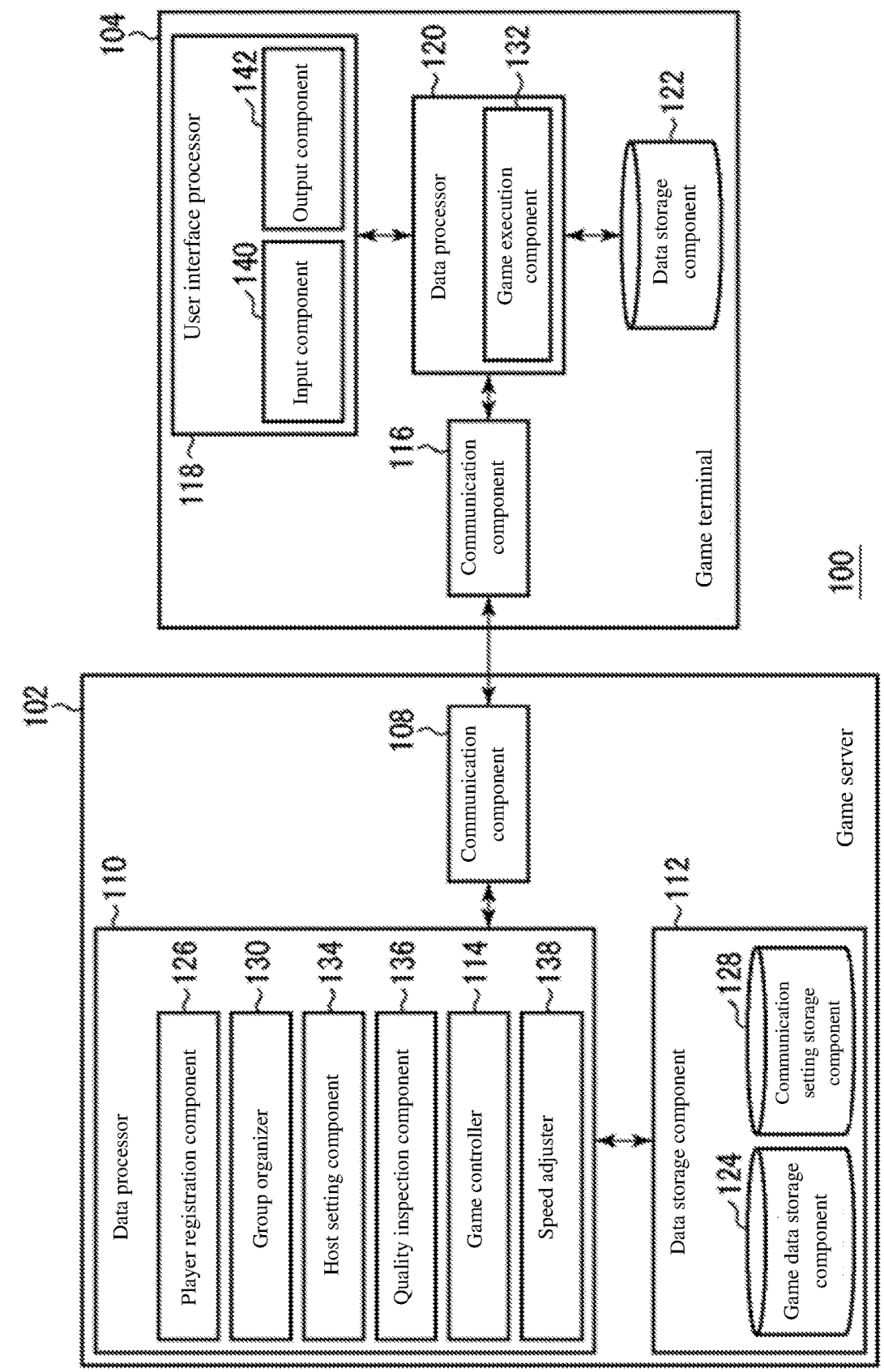
FIG. 3 is a functional block diagram of a game system according to one or more embodiments of the present invention.

FIG. 3 is a functional block diagram of the game system 100.

As described above, the game system 100 includes the game server 102 and the game terminals 104. The constituent elements of the game terminals 104 and the game server 102 comprise hardware such as a CPU (central processing unit), a computing device such as various co-processors, a storage device such as a memory or storage, and a wired or wireless communication line connecting these, and software that is stored in the storage device and that supplies processing commands to the computing device. The computer program may be constituted by a device driver, an operating system, various application programs located in upper layers thereof, and a library that provides shared functions to these programs. The blocks described below are not configured in hardware units, but are functional unit blocks.

The game server 102 may have a configuration including a web server, or the game terminals 104 may include a portable communication terminal and a web browser installed therein.

Game Server 102

The game server 102 includes a communication component 108, a data processor 110, and a data storage component 112.

The communication component 108 handles processing for communication with the game terminals 104 via the Internet 106. The data storage component 112 stores various kinds of data. The data processor 110 executes various kinds of processing based on the data acquired by the communication component 108 and the data stored in the data storage component 112. The data processor 110 also functions as an interface for the communication component 108 and the data storage component 112. The data storage component 112 stores various kinds of data.

The data storage component 112 includes a game data storage component 124 and a communication setting storage component 128.

In addition to the game program, the game data storage component 124 stores information indicating the play status of the players. The play status may be, for example, information related to the rank of a player, the level and equipment of a player character, items that are owned, skills, and the like. The communication setting storage component 128 stores communication setting information for the game terminals 104. The communication setting information will be discussed below with reference to FIG. 4.

The data processor 110 includes a player registration component 126, a group organizer 130, a host setting component 134, a quality inspection component 136, a game execution component game controller 114, and a speed adjuster 138.

The player registration component 126 receives player registrations from the game terminals 104 via the communication component 108. When a player registration is requested, the player registration component 126 gives the player a player ID and registers it in the communication setting storage component 128. Player registration is automatically requested when the game module of game G is installed on a game terminal 104.

The group organizer 130 organizes game groups (teams). When the communication component 108 receives a group creation request from the player Pa, the group organizer 130 sets up the game group G1 and discloses the establishment of the game group G1. The player Pa becomes the leader player of the game group G1. Next, when a group participation request specifying the game group G1 is received from the player Pb, the group organizer 130 associates the game group G1 with the player Pb. The player Pb becomes a member player of the game group G1. With this control method, the group organizer 130 sets up a game group and registers information related to the game group in the communication setting information (discussed below) of the communication setting storage component 128.

The host setting component 134 sets a host terminal for each game group. The host setting component 134 initially sets the leader terminal to be the host terminal. When a disqualification condition (discussed below) is met, the host setting component 134 changes the host terminal. The quality inspection component 136 inspects the communication quality (communication speed). The quality inspection component 136 periodically distributes a ping command via the communication component 108, and measures the ping value (communication speed) of each game terminal 104. The game controller 114 controls the progress of the game in conjunction with the game execution component 132 of the game terminals 104. The speed adjuster 138 sets the speed at which the game is executed by the game controller 114 according to the communication speed of the host terminal.

Game Terminals 104

The game terminals 104 each include a user interface processor 118, a communication component 116, a data processor 120, and a data storage component 122.

In addition to accepting operations from players via a touch panel, the user interface processor 118 also handles processing related to the user interface, such as image display and audio output. The communication component 116 handles processing for communication with the game server 102 and other game terminals 104 via the Internet 106. The data storage component 122 stores various kinds of data. The data processor 120 executes various kinds of processing based on the data acquired by the user interface processor 118 and the communication component 116 and the data stored in the data storage component 122. The data processor 120 also functions as an interface for the user interface processor 118, the communication component 116, and the data storage component 122.

The data processor 120 includes a game execution component 132.

The game execution component 132 controls the progress of the game in conjunction with the game server 102. The game execution component 132 of the game terminals 104 may be formed as a software module that is downloaded as part of the function of the game controller 114 from the game server 102.

The communication component 116 acquires various kinds of game information from the game server 102, and the data processor 120 displays a game screen on the user interface processor 118. Also, the user interface processor 118 detects various inputs by the user, and the data processor 120 notifies the game server 102 of the inputted information via the communication component 116. The game controller 114 of the game server 102 controls the progress of the game in conjunction with the game execution component 132 of the game terminals 104 according to this inputted information.

The user interface processor 118 includes an input component 140 for accepting input from the player and an output component 142 for outputting various kinds of information such as images and audio to the player. The input component 140 mainly detects a touch operation by a player on the screen as an input.

FIG. 4 is a data structure diagram of communication setting information 144.

The communication setting information 144 is stored in the communication setting storage component 128 of the game server 102. The game group is identified by a group ID (hereinafter also referred to as "GID"). When the leader player transmits a group creation request, the group organizer 130 sets the group ID. The game terminals 104 are identified by a terminal ID (hereinafter also referred to as "TID"). A known ID such as an IP address may also be used as the terminal ID.

A game group with the group ID of G01 (hereinafter referred to as "game group (G01)") corresponds to the game group G1 in FIG. 2. The game terminal 104 (T01), the game terminal 104 (T07), and the game terminal 104 (T14) are participating in the game group (G01). The game terminal 104 (T01) is the leader terminal, and the others are member terminals.

In the game group (G01), the leader terminal (T01) is the host terminal. Also, the ping value of the leader terminal (T01) is 10 msec, which is sufficiently fast. On the other hand, the member terminal (T07) has a ping value of 151 msec, which is an extremely low speed. In the game group (G01), the speed adjuster 138 sets the execution speed of the game G to match the fast leader terminal (T01) (host terminal). The member terminal (T07) (non-host terminal) cannot keep up with the operating speed of the leader player because the communication speed of the member terminal (T07) is far lower than that of the host terminal. On the other hand, the leader player can play the game G comfortably without being affected by the slow member terminal (T07).

In the game group (G02), the member terminal (T18) is set as the host terminal. Since the communication speed of the leader terminal (T15) is extremely low, the host setting component 134 changes the host terminal from the leader terminal (T15) to the member terminal (T18). The players in the game group (G02) can play the game G without being limited by the slow leader terminal 104 (T15).

Figure 5:
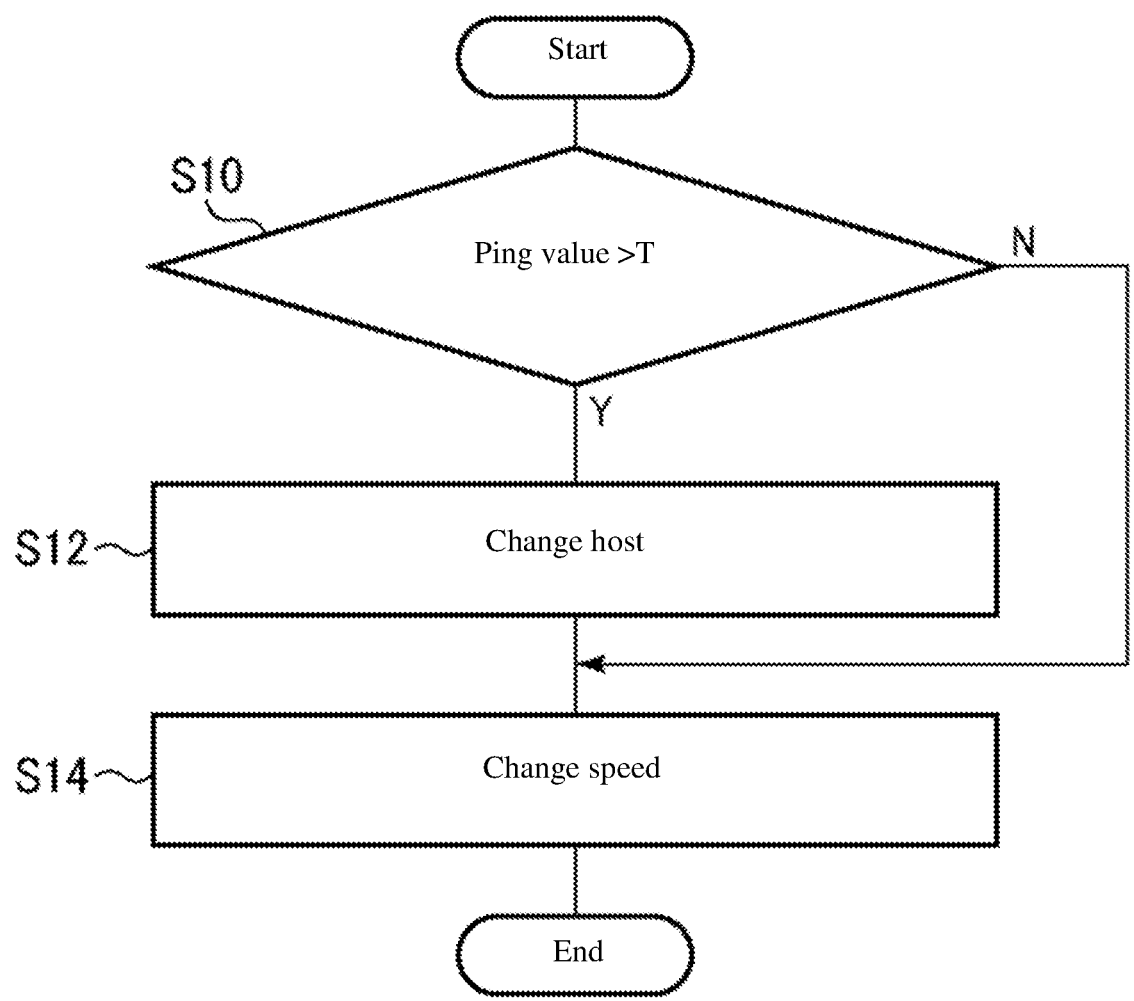
FIG. 5 is a flowchart showing the host change processing according to one or more embodiments of the present invention.

FIG. 5 is a flowchart showing the host change processing steps.

The quality inspection component 136 periodically transmits a ping command to the game terminals 104. FIG. 5 is executed every time the game server 102 receives a ping command response from the game terminal 104. Shown here are the processing steps after a ping has been returned from the host terminal of a certain game group and the quality inspection component 136 has checked that ping value.

When the ping value of the host terminal is over the threshold value T, that is, when the host terminal is so slow as to be unacceptable (Yes in S10), the host setting component 134 changes the host terminal (S12). The host setting component 134 selects the next host terminal from among the other non-host terminals belonging to the same game group. The selection may be random, or the game terminal 104 having the smallest ping value may be selected as the host terminal. Alternatively, one of the game terminals 104 whose ping value is at or under the threshold value T may be selected as the next host. If the ping value of the host terminal is at or under the threshold value T (No in S10), the host terminal is not changed.

The speed adjuster 138 changes the execution speed of the game G based on the communication speed of the existing host terminal or the newly set host terminal (S14). For example, let us assume that the host terminal is capable of transmitting five operation inputs per second. In this case, the game controller 114 executes the game G at an execution speed that allows five operation inputs per second to be accepted. For the non-host terminal A, which can process only two operation inputs per second, the execution speed of the game G of 5 times per second is too fast to keep up with. Compared to the player of the non-host terminal A, the player of the host terminal has an advantage because he can increase the number of operations per unit of time. The player of the host terminal is not inconvenienced by the communication speed of the slow non-host terminal A.

On the other hand, for the non-host terminal B, which can process 10 operation inputs per second, the execution speed of the game G of 5 times per second is restrictive. There is no superiority or inferiority for the player of the non-host terminal B or the player of the host terminal with respect to communication speed. Compared to the player of the non-host terminal A, the player of the host terminal is not at a disadvantage. Also, if the game G can be sufficiently enjoyed as long as five operation inputs can be performed per second, then the player of the non-host terminal B will not be extremely inconvenienced despite being subjected to this restriction.

However, when the communication speed is so slow that the host terminal can only process one operation input per second, it is undesirable for the whole group to be limited by the slow host terminal. If the host terminal is so slow that the ping value exceeds the threshold value T, the host setting component 134 will change the host terminal.

The game system 100 was described above based on one or more embodiments.

The game server 102 in one or more embodiments sets the leader terminal to be the host terminal at the start of the game G, but changes the host terminal as needed if a disqualification condition is met during the game. The host terminal is not changed when the host terminal and the game server 102 are disconnected, but when the communication speed of the host terminal drops to an unacceptable level, so interruption of the game G by disconnection of the host terminal can be prevented from occurring. Also, changing the host terminal when the communication speed of the host terminal is unacceptably low makes it easy to maintain the overall performance of the game group.

The host setting component 134 sets the leader terminal as the host terminal at the start of the game G. Since the execution speed of the game G is set based on the communication speed of the leader terminal, the leader player does not assume any operational handicap versus the member players. With this control method, the leader player can clearly exhibit the leadership needed to lead the game group, and this also provides an incentive to become a leader player.

However, when the communication speed of the leader terminal has dropped excessively and a disqualification condition is met, the host setting component 134 sets a member player as the new host terminal. The players may or may not be informed of a change in the host terminal. With this control method, even though as a general rule the leader player is given preferential treatment, the overall performance of the game group can be maintained by changing the host terminal if the leader terminal cannot provide the communication quality required of a host terminal. In other words, it is possible to strike a balance between the overall performance of the game group and the design concept of leader player priority.

Also, the host terminal does not necessarily have to be replaced even if the communication quality of the host terminal is inferior to that of the non-host terminals. The host terminal is changed when the ping value of the host terminal exceeds the threshold T, or in other words, when the communication speed of the host terminal has dropped to an unacceptable level. Setting the threshold T makes it less likely that the host terminal will end up being changed too frequently during the game.

In one or more embodiments of the present invention is not limited to or by the above embodiments and modification examples, and can be embodied by modifying the constituent elements without departing from the gist of the invention. Various inventions may be formed by appropriately combining a plurality of the constituent elements disclosed in the above embodiments and modification examples. Also, some of the constituent elements given in the above embodiments and modification examples may be omitted.

The gaming system 100 was described as being configured by a plurality of game terminals 104 and one game server 102, but some of the functions of the game terminals 104 may be realized by the game server 102, and some of the functions of game server 102 may be allocated to the game terminals 104. Also, a third device other than the game terminals 104 and the game server 102 may handle some of the functions.

The game system 100, which is a collection of the functions of the game terminals 104 and the functions of the 102 as illustrated in FIG. 3, can also be thought of broadly as a single "information processing device." How the functions required to realize one or more embodiments of the present invention are distributed to one or more pieces of hardware may be decided in consideration of the specifications required of the game system 100 and the processing capability of each piece of hardware.

The "communication quality" in one or more embodiments was described as being the communication speed, or more specifically the ping value. Communication quality may be ranked according to the communication carrier, the communication standard (such as Wi-Fi), or the like. Also, rather than determining whether the host terminal needs to be changed based on a single ping value, the need to change the host terminal may be determined based on a statistical value for a plurality of ping values. For example, a disqualification condition may be met when the average value for a plurality of the most recent ping values exceeds a threshold value T1, or a disqualification condition may be met when the percentage increase in a plurality of ping values (the percentage decrease in the communication speed) exceeds a threshold value T2. The disqualification condition may also be considered to be met when communicating in accordance with a low-speed communication standard.

In one or more embodiments, the leader terminal was initially set as the host terminal. In a modification example, any game terminal 104 may be initially set as the host terminal at the point when the game group is organized. The host setting component 134 may initially set as the host terminal the game terminal 104 with the highest communication speed out of all the game terminals 104 included in the game group, or a game terminal 104 that can execute communication processing in accordance with a certain communication standard (such as Wi-Fi) may be initially set as the host terminal.

With a server-client type of game system 100, the game terminals 104, rather than the game server 102, may choose the host terminal. When the game group is formed, the game server 102 sends a list of the leader terminal and client terminals included in the game group to the game terminals 104. The order of succession is set for the game terminals 104 registered in this list. For instance, let us assume that the game terminal 104A is in first place on the list, and the game terminal 104B is in second place.

The game terminals 104 periodically ping the game server 102. The game terminal 104A (host terminal) sends the non-host terminals a "host resignation" when the ping value exceeds the threshold T. The game terminal 104 corresponding to the next place on the host terminal list becomes the new host terminal, and a notice to this effect is transmitted to the game server 102. In the above example, the game terminal 104B in second place becomes the next host terminal. The speed adjuster 138 adjusts the execution speed of the game G according to the communication speed of the new host terminal (game terminal 104B). This control method also allows a host change to be effected based on communication quality.

When a plurality of game terminals 104 are connected peer-to-peer, or in other words, when one host terminal becomes the server and a non-host terminal becomes a client by connecting with the host terminal, the above control method is also applicable. The host terminal (server) periodically pings some server for a time test, and notifies the non-host terminals (clients) of a host resignation when the ping value exceeds the threshold value T. The host terminal may designate the game terminal 104 that is to become the next host terminal by any method, including randomly.

Then, the designated game terminal 104 may become the next host terminal. For peer-to-peer, even without speed adjustment, the entire game group is limited by the processing speed of the host terminal.

In one or more embodiments, a server-client type of network game was discussed, but as mentioned above, a host change can be similarly accomplished with a peer-to-peer type of network game. Also, as in Patent Literature 1, when a game server 102 that manages a peer-to-peer network game monitors the communication quality of the game terminals 104 and it is determined that the communication quality of the host terminal has decreased, a host change may be indicated with the game server 102 interposed in the peer-to-peer network game.

In one or more embodiments, a game played on smartphones was described, but the game system 100 may also be used on a home-use game machine, a personal computer, or the like. This may be an arcade game, or may be tied in with an arcade game.

The game controller 114 may not change the leader terminal when the host setting component 134 has changed the host terminal. This makes it possible to provide continued incentives to be a leader player who can lead a game group, to players who make a group creation request.

The configuration may be such that game controller 114 uses up action points (costs) necessary for game play for a player who has made a group creation request (leader player), and does not use up action points for players who make a group participation request (member players). The configuration may be such that when the host setting component 134 changes the host terminal and the game controller 114 does not change the leader terminal (leader maintained and host changed), action points are not used up for the player of the host terminal after the change (member player). Also, when the host setting component 134 changes the host terminal, the game controller 114 may also change the leader (leader changed, host changed). In this case, after the players have been notified to that effect, action points may be used up for the player of the host terminal after the change (new leader). The number of action points used up for the new leader may be smaller than that for the former leader. The configuration may be such that no action points are used up for the former leader (non-host terminal) thereafter. Also, the configuration may be such that instead of reducing the consumption of action points of the new leader, the former leader contributes action points equivalent to this reduced amount.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 100 game system,
102 game server,
104 game terminal,
106 Internet,
108 communication component,
110 data processor,
112 data storage component,
114 game controller,
116 communication component,
118 user interface processor,
120 data processor,
122 data storage component,
124 game data storage component,
126 player registration component,
128 communication setting storage component,
130 group organizer,
132 game execution component,
134 host setting component,
136 quality inspection component,
138 speed adjuster,
140 input component,
142 output component,
144 communication setting information

What is claimed is:

1. An information processing device, comprising:
a processor that controls progress of a game in which a plurality of players can participate simultaneously based on operation inputs at a plurality of game terminals, wherein the plurality of game terminals comprises a leader terminal and a member terminal, and
a memory connected to the processor and that manages one of the plurality of game terminals as a host terminal, wherein
the processor causes the memory to initially set the leader terminal as the host terminal,
the processor measures a first communication speed of the leader terminal and a second communication speed of the member terminal during execution of the game terminal,
when the leader terminal is the host terminal, if the second communication speed is higher than the first communication speed and the first communication speed is not higher than a predetermined speed,
the processor causes the memory to set the member terminal as the host terminal, without changing a leader player so as to prevent interruption of the game by avoiding changes of the host terminal during game play based on consideration of the first communication speed and the second communication speed through the use of the predetermined speed,
the processor causes the leader player that owns the leader terminal to incur cost associated with action in game play, and
after the member terminal is set as the host terminal, the processor does not cause a member player that owns the member terminal to incur the cost.

2. The information processing device according to claim 1, wherein the processor causes the memory to set the member terminal as the host terminal in a state in which the game continues and does not notify the leader terminal that the member terminal has been set as the host terminal.

3. The information processing device according to claim 1, wherein the processor changes the host terminal when a statistical value of a plurality of measurements of a communication speed of the leader terminal is not higher than the predetermined speed.

4. A game processing method that causes a computer to execute a game program, the method comprising:
controlling, with a processor, progress of a game in which a plurality of players can participate simultaneously, based on operation inputs at a plurality of game terminals; wherein the plurality of game terminals comprises a leader terminal and a member terminal,
managing, with a memory, one of the plurality of game terminals as a host terminal;
causing, with the processor, the memory to initially set the leader terminal as the host terminal;

measuring, with the processor, a first communication speed of the leader terminal and a second communication speed of the member terminal during execution of the game;

when the leader terminal is the host terminal, if the second communication speed is higher than the first communication speed and the first communication speed is not higher than a predetermined speed, causing, with the processor, the memory to set the member terminal as the host terminal, without changing a leader player so as to prevent interruption of the game by avoiding changes of the host terminal during game play based on consideration of the first communication speed and the second communication speed through the use of the predetermined speed;

causing, with the processor, the leader player that owns the leader terminal to incur cost associated with action in game play; and after the member terminal is set as the host terminal, not causing, with the processor, a member player that owns the member terminal to incur the cost.

* * * * *